United States Patent
Funato (10) Patent No.: US 9,995,362 B2
(45) Date of Patent: Jun. 12, 2018

(54) CYLINDER DEVICE

(71) Applicant: KYB Corporation, Tokyo (JP)

(72) Inventor: Hiroshi Funato, Gifu (JP)

(73) Assignee: KYB Corporation, Tokyo (JP)

( * ) Notice: Subject to any disclaimer, the term of this patent is extended or adjusted under 35 U.S.C. 154(b) by 0 days. days.

(21) Appl. No.: 15/124,141

(22) PCT Filed: Apr. 2, 2015

(86) PCT No.: PCT/JP2015/060503
§ 371 (c)(1),
(2) Date: Sep. 7, 2016

(87) PCT Pub. No.: WO2015/159722
PCT Pub. Date: Oct. 22, 2015

(65) Prior Publication Data
US 2017/0016505 A1    Jan. 19, 2017

(30) Foreign Application Priority Data

Apr. 17, 2014 (JP) .................................. 2014-085190

(51) Int. Cl.
*F16F 9/00* (2006.01)
*F16F 9/48* (2006.01)
(Continued)

(52) U.S. Cl.
CPC ................ *F16F 9/486* (2013.01); *F16F 9/32* (2013.01); *F16F 9/3228* (2013.01); *F16F 9/34* (2013.01); *F16F 9/48* (2013.01)

(58) Field of Classification Search
CPC ...... F16F 9/3228; F16F 9/3214; F16F 9/3221; F16F 9/34; F16F 9/341; F16F 9/342;
(Continued)

(56) References Cited

U.S. PATENT DOCUMENTS 3,300,202 A * 1/1967 Vinton ..................... B60G 3/01
188/297
4,030,715 A * 6/1977 Duran .................... B60G 13/10
188/317
(Continued)

FOREIGN PATENT DOCUMENTS

DE    4108801 A1 *  9/1992  ......... B60G 17/0416
DE    10233669 A1 *  2/2004  .......... F15B 15/1447
(Continued)

OTHER PUBLICATIONS

English language abstract of DE 4108801 (no date).*
English language abstract of DE 10233669 (no date).*

*Primary Examiner* — Nicholas J Lane
(74) *Attorney, Agent, or Firm* — Rabin & Berdo, P.C.

(57) ABSTRACT

A cylinder device includes a piston rod that is inserted into a cylinder so as to be movable back and forth. The piston rod has a rod portion that extends outside the cylinder, and a piston connected to an end portion of the rod portion, the piston moving in the cylinder in a slidable manner. The rod portion has a rod inner space formed in the rod portion, the rod inner space communicating with the piston-side chamber of the cylinder, a first communicating passage that connects the rod inner space and the rod-side chamber of the cylinder, and an orifice plug provided in the first communicating passage in a changeable manner. The piston is connected to the rod portion so as to cover a part of the orifice plug.

19 Claims, 5 Drawing Sheets

(51) Int. Cl.
*F16F 9/34* (2006.01)
*F16F 9/32* (2006.01)

(58) Field of Classification Search
CPC ... F16F 9/3405; F15B 15/204; F15B 15/1447; F15B 15/1457; F15B 2015/1495; F16J 1/005
See application file for complete search history.

(56) References Cited

U.S. PATENT DOCUMENTS

| | | | | |
|---|---|---|---|---|
| 4,863,147 | A | * | 9/1989 | Loeber ............... F16F 9/06 188/319.2 |
| 6,446,944 | B1 | * | 9/2002 | Ward ................. F16F 9/48 188/286 |
| 2005/0167164 | A1 | * | 8/2005 | Takeda ............... B60G 5/00 177/136 |
| 2006/0032369 | A1 | * | 2/2006 | Rafn ................. F15B 15/1447 92/128 |
| 2008/0149438 | A1 | | 6/2008 | Chikamatsu et al. |

FOREIGN PATENT DOCUMENTS

| | | |
|---|---|---|
| JP | 2005-227270 A | 8/2005 |
| JP | 2008-157393 A | 7/2008 |
| JP | 2009-243634 A | 10/2009 |

* cited by examiner

CYLINDER DEVICE

TECHNICAL FIELD

The present invention relates to a cylinder device used as a shock absorber and an actuator.

BACKGROUND ART

JP2005-227270A discloses a suspension cylinder that includes a piston and a cylinder to which the piston is slidably attached. The piston is constituted of a bottom-capped piston main body and a tubular ring member that is provided on the upper outer circumferential side of the piston main body.

An annular cavity is provided between the piston main body and the cylinder. A predetermined number of first orifices are provided in the piston main body in a manner separated in the circumferential direction. The first orifices are each formed such that an internal space of the piston main body is communicated with the cavity. In addition, at positions different from those of the first orifices in the longitudinal direction, a predetermined number of second orifices are provided in the piston main body in a manner separated in the circumferential direction. Check balls are respectively provided on the outer side of the second orifices.

SUMMARY OF INVENTION

In the suspension cylinder described in JP2005-227270A, it is conceivable to attach orifice plugs to oil passages of the piston main body instead of the first orifices such that damping force is adjustable. In such a case, there is a risk that the orifice plug may be loosened and fall off from the oil passage of the piston main body during use.

In order to prevent the orifice plug from being loosened, it is conceivable to provide, in the oil passage of the piston main body, a seat surface with which a bottom surface of the orifice plug is brought into contact, and to attach the orifice plug to the seat surface at high tightening torque. However, when the cylinder is configured as above, boring processing of the oil passages of the piston main body becomes complex.

An object of the present invention is to prevent an orifice plug from falling off by a simple method.

According to one aspect of the present invention, a cylinder device includes a cylinder and a piston rod that is inserted into the cylinder so as to be movable back and forth. The piston rod has: a rod portion that extends outside the cylinder; and a piston connected to an end portion of the rod portion, the piston moving in the cylinder in a slidable manner and partitioning an interior of the cylinder into a piston-side chamber and a rod-side chamber. The rod portion has: a rod inner space formed in the rod portion, the rod inner space communicating with the piston-side chamber of the cylinder; a first communicating passage that connects the rod inner space and the rod-side chamber of the cylinder; and an orifice plug provided in the first communicating passage in a changeable manner. The piston is connected to the rod portion so as to cover a part of the orifice plug.

DESCRIPTION OF EMBODIMENTS

A cylinder device according to an embodiment of the present invention will be described below with reference to the drawings.

First Embodiment

Figure 1:
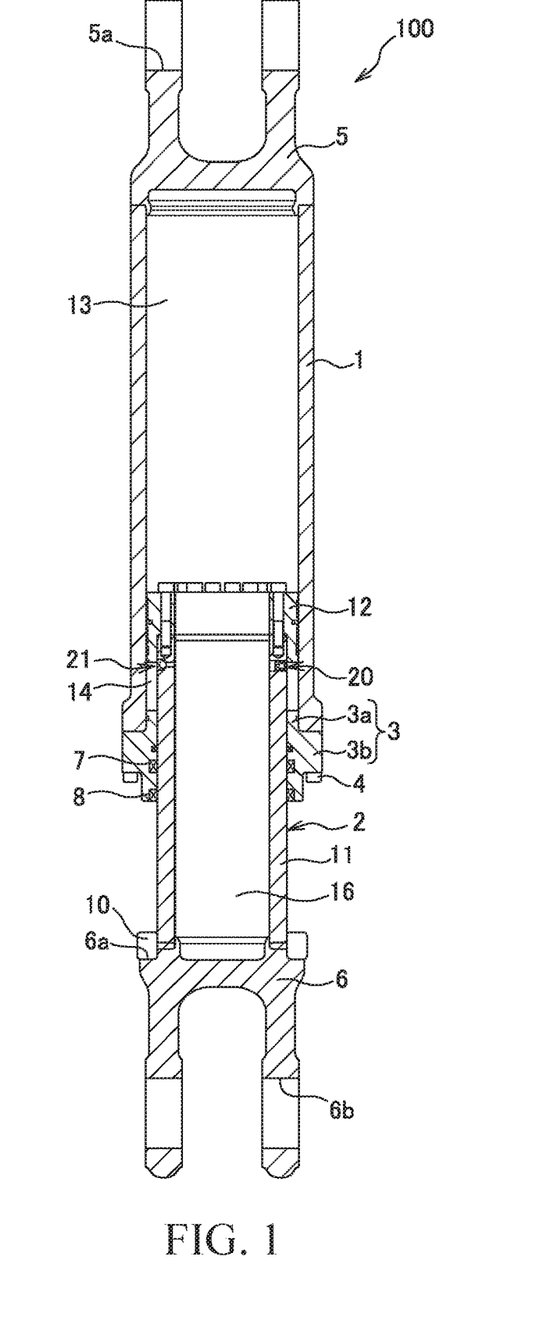
FIG. 1 is a cross-sectional view of a shock absorber according to a first embodiment of the present invention.
Figure 2:
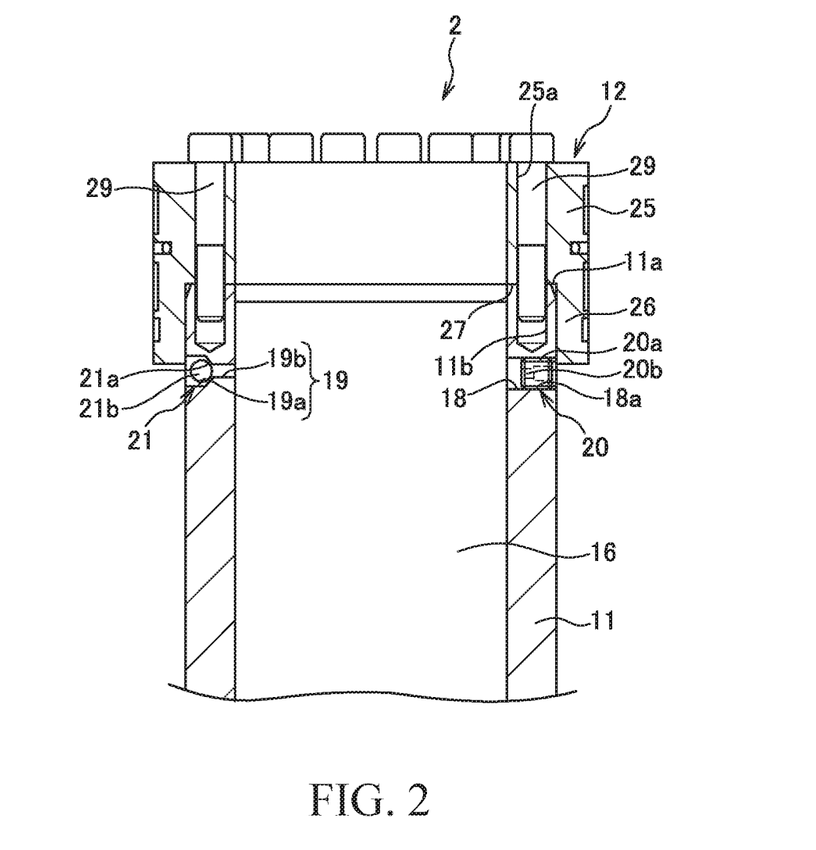
FIG. 2 is a partially enlarged view of a piston rod in FIG. 1.

In this first embodiment, a case in which a cylinder device is a shock absorber 100 installed in a vehicle will be described with reference to FIGS. 1 and 2.

The shock absorber 100 is a device that suppresses vibration of a vehicle body by generating damping force by, for example, being interposed between the vehicle body and an axle shaft of the vehicle. length The shock absorber 100 includes a tubular cylinder 1 and a piston rod 2 that is inserted into the cylinder 1 so as to be freely movable back and forth. In this embodiment, as shown in FIG. 1, the shock absorber 100 is installed in the vehicle in an orientation at which the cylinder 1 is positioned at the upper side and the piston rod 2 is positioned at the lower side.

The piston rod 2 includes a rod portion 11 that extends outside the cylinder 1 and a piston 12 that is connected to an end portion of the rod portion 11 and moves in the cylinder 1 in a slidable manner.

An interior of the cylinder 1 is partitioned by the piston 12 into a piston-side chamber 13 and a rod-side chamber 14. The piston-side chamber 13 and the rod-side chamber 14 are filled with working oil serving as working fluid. In addition, gas is charged in the cylinder 1 for achieving a spring effect using volume change in the cylinder 1 due to inward and outward movement of the piston rod 2 relative to the cylinder 1.

A cylinder head 3 through which the rod portion 11 of the piston rod 2 is slidably inserted is provided on an end portion of the cylinder 1. The cylinder head 3 has a cylindrical main body portion 3a and a flange portion 3b having a larger diameter than the main body portion 3a. The cylinder head 3 is fixed to the cylinder 1 by fastening the flange portion 3b to the end portion of the cylinder 1 with bolts 4. On an inner circumferential surface of the main body portion 3a of the cylinder head 3, a seal member 7 and a dust seal 8, which are in sliding contact with an outer circumferential surface of the rod portion 11, are provided.

A bottom member 5 is connected at an end portion of the cylinder 1 on the opposite side from the cylinder head 3. The bottom member 5 has an attachment portion 5a for attaching the shock absorber 100 to the vehicle.

The rod portion 11 is a cylindrical member. A rod inner chamber 16 serving as a rod inner space, which communicates with the piston-side chamber 13 of the cylinder 1, is formed inside the rod portion 11. The rod portion 11 includes: a first communicating passage 18 and a second communicating passage 19 that connect the rod inner chamber 16 and the rod-side chamber 14 of the cylinder 1; an orifice plug 20 that is provided in the first communicating passage 18 in an exchangeable manner and imparts resistance to the working oil passing therethrough to generate damping force; and a check valve 21 that is provided in the second communicating passage 19 and allows the flow of the working oil only from the rod inner chamber 16 to the rod-side chamber 14.

A rod head 6 is provided on the end portion of the rod portion 11 on the side extending out from the cylinder 1. An open end of the rod portion 11 on the piston 12 side communicates with the piston-side chamber 13, and an open end of the rod portion 11 on the opposite side from the piston 12 is closed by the rod head 6. As described above, the one end of the rod inner chamber 16 communicates with the piston-side chamber 13, and the other end of the rod inner chamber 16 is closed by the rod head 6.

The rod head 6 has a stopper portion 6a that is formed to have a larger diameter than the piston rod 2 and defines a stroke end during contraction of the shock absorber 100 and an attachment portion 6b for attaching the shock absorber 100 to the vehicle. An annular cushion ring 10 is provided on the stopper portion 6a. The cushion ring 10 prevents collision between the cylinder head 3 and the rod head 6 at the stroke end during contraction of the shock absorber 100.

When the shock absorber 100 is contracted, because the pressures in the piston-side chamber 13 and the rod inner chamber 16 are increased and the check valve 21 is opened, the working oil in the piston-side chamber 13 and the rod inner chamber 16 flows into the rod-side chamber 14 through the orifice plug 20 and the check valve 21. On the other hand, when the shock absorber 100 is extended, because the pressure in the rod-side chamber 14 is increased and the check valve 21 is closed, the working oil in the rod-side chamber 14 flows into the piston-side chamber 13 and the rod inner chamber 16 through the orifice plug 20 only. With such a configuration, damping force generated by the shock absorber 100 during extension becomes greater than that generated during contraction. Thus, in a case when the vehicle drives over a bump on a road surface, the shock absorber 100 is contracted in a relatively smooth manner, and thereafter, the shock absorber generates large damping force during extension, and thereby, the vibration exerted from the road surface to the vehicle body is effectively absorbed.

In the following, the orifice plug 20 and the check valve 21 will be described in detail.

The first communicating passage 18 and the second communicating passage 19 are formed so as to have opening portions at the inner and outer circumferential surfaces of the rod portion 11 and to penetrate the rod portion 11 in the radial direction. The first communicating passage 18 and the second communicating passage 19 are formed at substantially the same positions in the axial direction of the rod portion 11 and formed at different positions in the circumferential direction of the rod portion 11.

The first communicating passage 18 is formed to have a constant inner diameter. On an inner circumferential surface of the first communicating passage 18, while a female screw 18a is formed on the outer-circumferential-surface side of the rod portion 11, a female screw is not formed on the inner-circumferential-surface side of the rod portion 11.

The orifice plug 20 has a male screw 20a that is formed on an outer circumferential surface thereof and threaded to the female screw 18a of the first communicating passage 18 and an orifice portion 20b that restricts the flow of the working oil. The orifice plug 20 is threaded and fastened to the first communicating passage 18, and damping force generated by the orifice plug 20 is determined by a diameter of the orifice portion 20b.

The second communicating passage 19 has a large-diameter portion 19a that opens at the outer circumferential surface of the rod portion 11 and a small-diameter portion 19b that opens at the inner circumferential surface of the rod portion 11 and has smaller diameter than the large-diameter portion 19a. The check valve 21 has an annular seat surface 21a that is formed between the large-diameter portion 19a and the small-diameter portion 19b and a ball 21b that is accommodated in the large-diameter portion 19a and has a diameter larger than an inner diameter of the small-diameter portion 19b. When pressure on the large-diameter portion 19a side is greater than pressure on the small-diameter portion 19b side, the ball 21b is seated on the seat surface 21a, and the flow of the working oil from the large-diameter portion 19a side to the small-diameter portion 19b side is shut off. On the other hand, when the pressure on the small-diameter portion 19b side is greater than the pressure on the large-diameter portion 19a side, the ball 21b is separated from the seat surface 21a, and the flow of the working oil from the small-diameter portion 19b side to the large-diameter portion 19a side is allowed.

The piston 12 is a cylindrical member that includes a fastening portion 25 that is fastened to the rod portion 11 and a ring portion 26 that is provided along the outer circumferential surface of the rod portion 11. An inner diameter of the fastening portion 25 is substantially the same as an inner diameter of the rod portion 11, and an inner diameter of the ring portion 26 is substantially the same as an outer diameter of the rod portion 11. As described above, the fastening portion 25 is formed such that its inner diameter is smaller than the inner diameter of the ring portion 26. With such a configuration, on an inner circumference of the piston 12, an annular end surface 27, which is flat in the radial direction, is formed at a boundary between the fastening portion 25 and the ring portion 26. On the other hand, an outer circumferential surface of the fastening portion 25 and an outer circumferential surface of the ring portion 26 are formed continuously on the same plane. In other words, an outer diameter of the piston 12 is constant in the axial direction. However, the outer diameter of the piston 12 needs not be constant in the axial direction.

In the fastening portion 25, fastening bores 25a are formed along the axial direction so as to open at the annular end surface 27. A plurality of fastening bores 25a are formed with predetermined gaps therebetween in the circumferential direction. Also in the rod portion 11, fastening holes 11b are formed along the axial direction so as to open at an end surface 11a. A plurality of fastening holes 11b are formed with the same gaps as with the fastening bores 25a in the circumferential direction.

When the piston 12 is connected to the rod portion 11, the rod portion 11 is inserted into the ring portion 26 of the piston 12 until the annular end surface 27 of the piston 12 comes into contact with the end surface 11a of the rod portion 11, and the fastening bores 25a are matched with the fastening holes 11b. In this state, bolts 29 are threaded through the fastening bores 25a and the fastening holes 11b. As described above, the piston 12 is fixed to the rod portion 11.

In a state in which the piston 12 is connected to the rod portion 11, the ring portion 26 of the piston 12 closes a part of the opening portion of the first communicating passage 18 at the outer circumferential surface of the rod portion 11. In other words, the piston 12 is connected to the rod portion 11 so as to close a part of the opening portion of the first communicating passage 18 at the outer circumferential surface of the rod portion 11. As described above, the piston 12 is connected to the rod portion 11 such that the ring portion 26 covers a part of the orifice plug 20. With such a configuration, the orifice plug 20 is prevented from falling off from the first communicating passage 18 to the rod-side chamber 14. Because a female screw is not formed on the inner circumferential surface of the first communicating passage 18 on the inner-circumferential-surface side of the rod portion 11, the orifice plug 20 also does not fall off to the rod inner chamber 16. As described above, it is possible to prevent the orifice plug 20 from falling off by the piston 12 that is connected to the rod portion 11.

In addition, in a state in which the piston 12 is connected to the rod portion 11, the ring portion 26 of the piston 12 closes a part of the opening portion of the second communicating passage 19 at the outer circumferential surface of the rod portion 11. In other words, the piston 12 is connected to the rod portion 11 such that the ring portion 26 covers a part of the check valve 21. With such a configuration, the ball 21b of the check valve 21 is prevented from falling off from the second communicating passage 19 to the rod-side chamber 14. Because the ball 21b has a diameter larger than the inner diameter of the small-diameter portion 19b of the second communicating passage 19, the ball 21b also does not fall off to the rod inner chamber 16. As described above, it is also possible to prevent the check valve 21 from falling off by the piston 12 that is connected to the rod portion 11.

In order to prevent the orifice plug 20 and the check valve 21 from falling off, a length of the ring portion 26 of the piston 12 in the axial direction needs to be set suitably. Specifically, the length of the ring portion 26 in the axial direction needs to be set such that a tip end of the ring portion 26 overlaps with a part of the orifice plug 20 but does not reduce a flow path of the orifice portion 20b, and at the same time, the length of the ring portion 26 needs to be set such that the ball 21b of the check valve 21 does not fall off from the large-diameter portion 19a of the second communicating passage 19.

To change the orifice plug 20, the bolts 29 are loosened and removed to release fixation between the piston 12 and the rod portion 11, and thereby, the piston 12 is detached from the rod portion 11. By doing so, an end surface of the orifice plug 20 is exposed to the opening portion of the first communicating passage 18 at the outer circumferential surface of the rod portion 11. In this state, the orifice plug 20 is removed from the first communicating passage 18 by attaching a tool to the orifice plug 20 from the outer-circumferential-surface side of the rod portion 11 and by rotating the orifice plug 20. The orifice plug 20 having the orifice portion 20b with the desired diameter is then fastened to the first communicating passage 18 using the tool.

As described above, changing of the orifice plug 20 is performed by detaching the piston 12 from the rod portion 11 and by changing the orifice plug 20 that is threaded and fastened to the first communicating passage 18 using the tool. As described above, because the orifice plug 20 can easily be changed with that having the orifice portion 20b having a different diameter, it is possible to easily adjust damping force generated by the shock absorber 100.

According to the first embodiment described above, advantages described below are afforded.

With the shock absorber 100 having a configuration in which the first communicating passage 18 that connects the rod inner chamber 16 and the rod-side chamber 14 is provided on the rod portion 11 and damping force is generated by restricting the flow of the working oil through the first communicating passage 18, because the orifice plug 20 is provided in the first communicating passage 18 in a changeable manner in this embodiment, the desired damping force characteristic can be achieved. In addition, because the piston 12 is connected to the end portion of the rod portion 11 so as to cover a part of the orifice plug 20, the orifice plug 20 is prevented from being loosened and falling off due to vibration. As described above, it is possible to prevent the orifice plug 20 from falling off by a simple method.

In addition, because the orifice plug 20 is prevented from falling off by the piston 12, when the orifice plug 20 is attached to the rod portion 11, there is no need to perform an anti-loosening process using a thread-locking agent, a caulking processing, and so forth. Because the anti-loosening process is not required, it is possible to change the orifice plug 20 with ease.

In addition, because there is no need to provide the seat surface for tightening the orifice plug 20 at high tightening torque in the first communicating passage 18 in order to prevent the orifice plug 20 from being loosened, it is possible to configure the first communicating passage 18 by only performing processing to achieve a constant inner diameter and forming the female screw 18a. As described above, it is easy to process the first communicating passage 18.

In addition, because the first communicating passage 18 has the constant inner diameter and there is no restricting portion, damping effect is exhibited only by the orifice portion 20b of the orifice plug 20. Therefore, the effect of the viscosity of the working oil on the damping effect is little, and so, changes in the damping force characteristic with respect to changes in the viscosity can be made small and the damping force can be adjusted with ease.

In the following, a modification of this first embodiment will be described.

(1) A plurality of orifice plugs 20 may be provided. In this case, a plurality of first communicating passages 18 are formed in the circumferential direction of the rod portion 11, and the orifice plugs 20 are respectively fastened to the first communicating passages 18. The piston 12 is connected to the rod portion 11 so as to cover parts of the respective orifice plugs 20.

(2) In the above-mentioned embodiment, the orifice plug 20 is configured so as to be threaded and fasten to the first communicating passage 18. Instead of this configuration, the orifice plug 20 may be press-fitted into the first communicating passage 18.

(3) In the above-mentioned embodiment, the first communicating passage 18 is configured to have a constant inner diameter. Instead of this configuration, in order to prevent the orifice plug 20 from falling off into the rod inner chamber 16, the inner diameter of the first communicating passage 18 on the rod inner chamber 16 side may be made slightly smaller.

(4) In the above-mentioned embodiment, the shock absorber 100 is configured such that the spring effect is achieved by the gas charged in the cylinder 1. Instead of this configuration, a suspension spring may be provided, separately from the shock absorber 100, between the vehicle body and the axle shaft.

(5) In the above-mentioned embodiment, the piston 12 is configured so as to be fixed to the rod portion 11 by the bolts 29. Instead of this configuration, the piston 12 may be fixed to the outer circumference of the rod portion 11 by screws.

Second Embodiment

Figure 3:
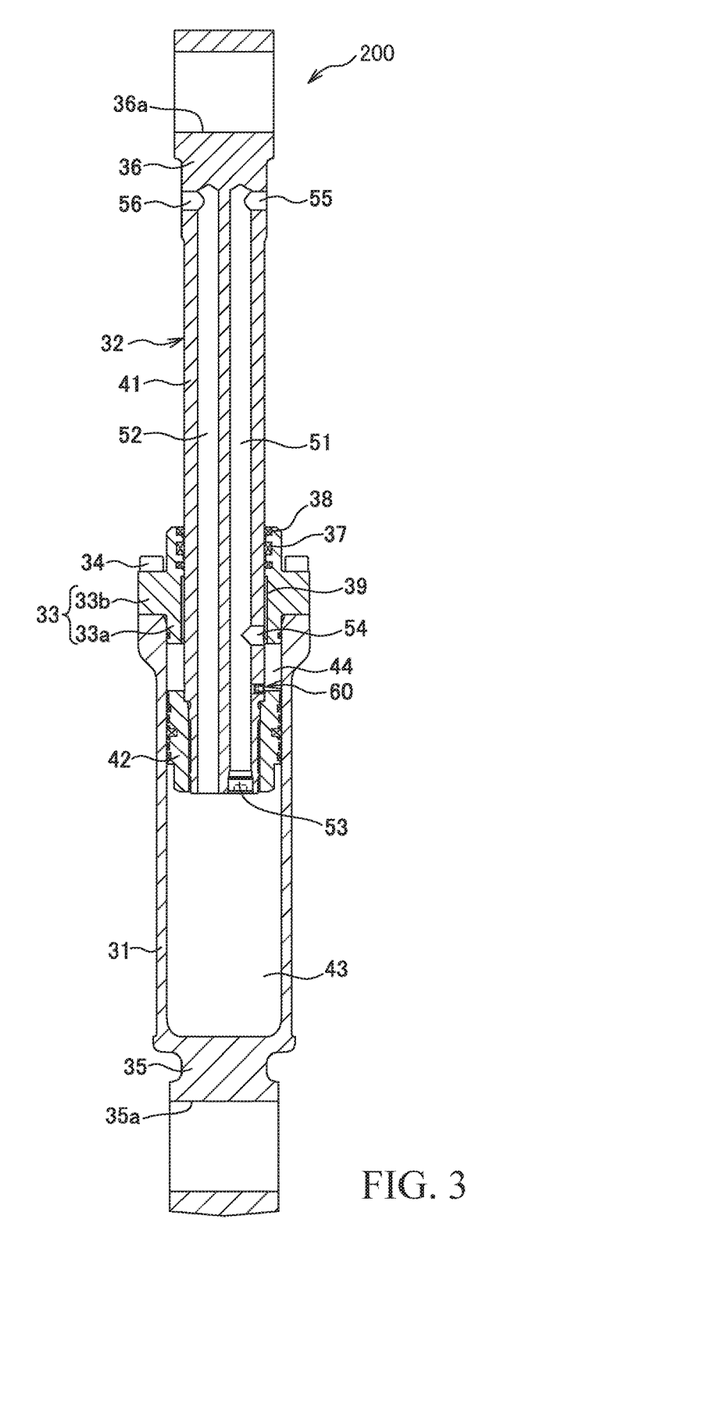
FIG. 3 is a cross-sectional view of an actuator according to a second embodiment of the present invention.
Figure 4:
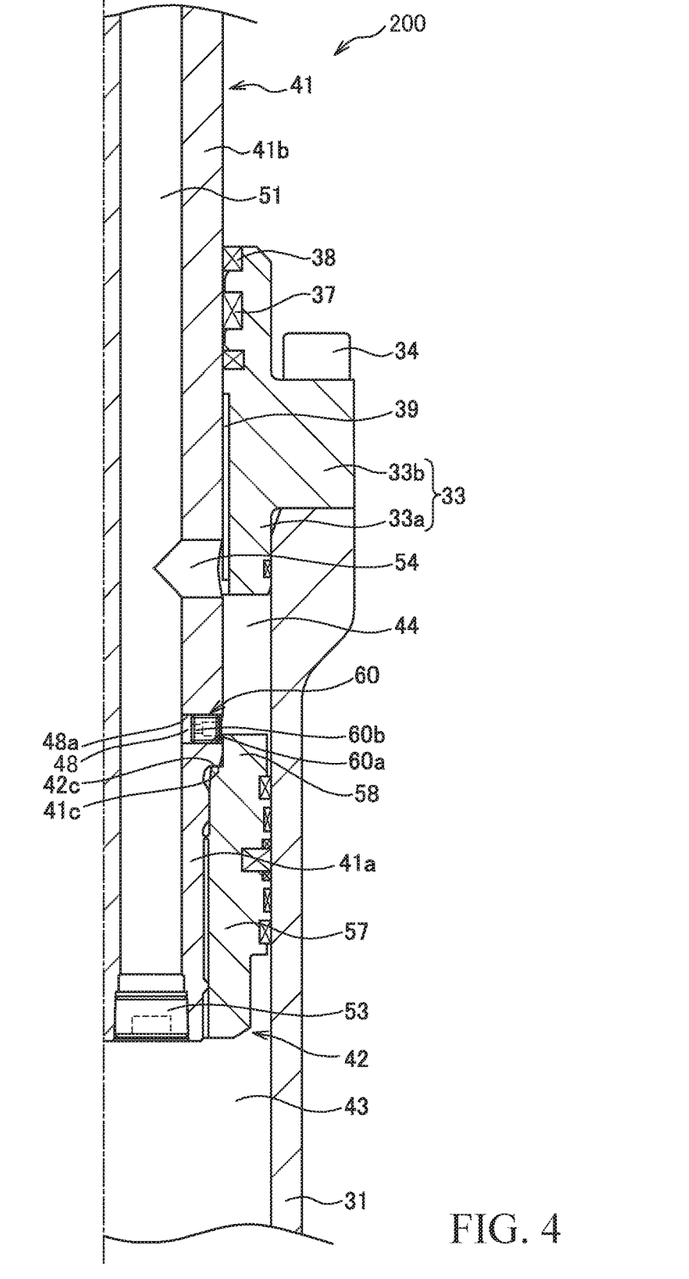
FIG. 4 is a partially enlarged view of FIG. 3.
Figure 5:
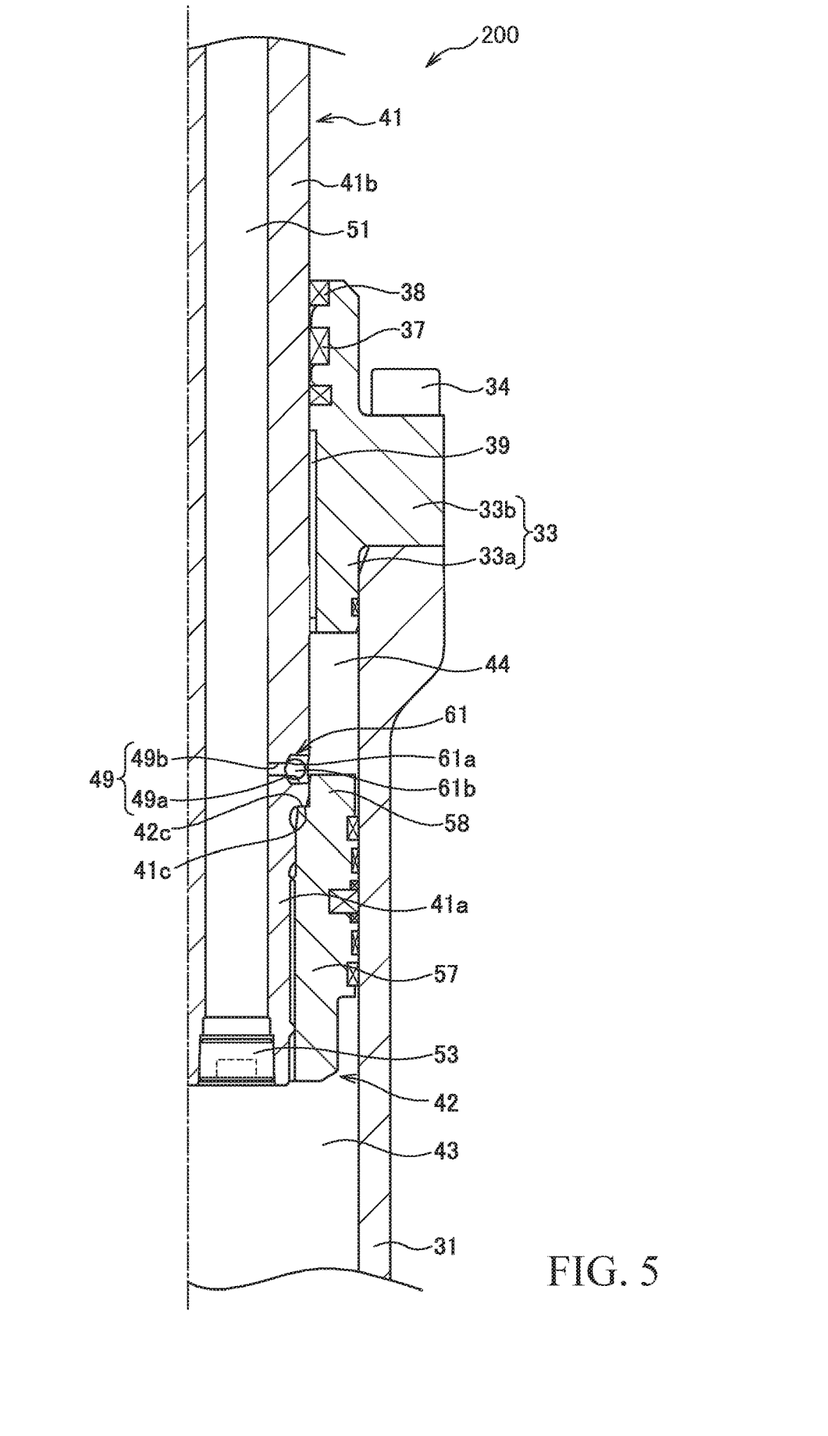
FIG. 5 is a partial cross-sectional view of the actuator according to the second embodiment of the present invention showing a different cross-section from that shown in FIG. 3.

In this second embodiment, a case in which the cylinder device is an actuator 200 that extends and contracts by the working fluid supplied from a fluid pressure source to drive a load will be described with reference to FIGS. 3 to 5.

The actuator 200 is used as, for example, a bucket cylinder that is installed on a hydraulic shovel, and a bucket of the hydraulic shovel is rotated as the actuator 200 extends and contracts.

The actuator 200 includes a tubular cylinder 31 and a piston rod 32 that is inserted into the cylinder 31 so as to be freely movable back and forth.

The piston rod 32 includes a rod portion 41 that extends outside the cylinder 31 and a piston 42 that is connected to an end portion of the rod portion 41 and moves in the cylinder 1 in a slidable manner.

An interior of the cylinder 31 is partitioned by the piston 42 into a piston-side chamber 43 and a rod-side chamber 44. The piston-side chamber 43 and the rod-side chamber 44 are filled with working oil serving as working fluid. The piston-side chamber 43 and the rod-side chamber 44 are connected to a hydraulic pump serving as a hydraulic source or a tank through a switching valve. When the one of the piston-side chamber 43 and the rod-side chamber 44 is connected to the hydraulic pump, the other is connected to the tank. The actuator 200 extends and contracts as the working oil is guided from the hydraulic pump to the piston-side chamber 43 or the rod-side chamber 44 and the piston rod 32 is moved in the axial direction.

A cylinder head 33 through which the rod portion 41 of the piston rod 32 is slidably inserted is provided on an end portion of the cylinder 31. The cylinder head 33 has a cylindrical main body portion 33a and a flange portion 33b having a larger diameter than the main body portion 33a. The cylinder head 33 is fixed to the cylinder 31 by fastening the flange portion 33b to the end portion of the cylinder 31 using bolts 34. On an inner circumferential surface of the main body portion 33a of the cylinder head 33, a seal member 37, a dust seal 38, and a bearing 39, which are in sliding contact with an outer circumferential surface of the rod portion 41, are provided.

A bottom member 35 is connected at an end portion of the cylinder 31 on the opposite side from the cylinder head 33. The bottom member 35 has an attachment portion 35a for attaching the actuator 200 to the hydraulic shovel.

The rod portion 41 has a small-diameter portion 41a that is formed on a tip end portion and a large-diameter portion 41b that is in sliding contact with the inner circumferential surface of the cylinder head 33 and that has a larger diameter than the small-diameter portion 41a. On an outer circumference of the rod portion 41, an annular shoulder end surface 41c, which is flat in the radial direction, is formed at a boundary between the small-diameter portion 41a and the large-diameter portion 41b. A male screw is formed on the small-diameter portion 41a.

The piston 42 is a cylindrical member that includes a fastening portion 57 that has a female screw formed on an inner circumference thereof and is fastened to the rod portion 41 and a ring portion 58 that is provided along the outer circumferential surface of the rod portion 41. The ring portion 58 is formed to have an inner diameter larger than an inner diameter of the fastening portion 57. With such a configuration, on the inner circumference of the piston 42, an annular end surface 42c, which is flat in the radial direction, is formed at a boundary between the fastening portion 57 and the ring portion 58.

When the piston 42 is connected to the rod portion 41, the fastening portion 57 of the piston 42 is threaded to the small-diameter portion 41a of the rod portion 41 until the annular end surface 42c of the piston 42 comes into contact with the shoulder end surface 41c of the rod portion 41, and the piston 42 is tightened at a predetermined tightening torque.

A rod head 36 is provided on an end portion of the rod portion 41 on the side extending out from the cylinder 1. An attachment portion 36a for attaching the actuator 200 to the hydraulic shovel is formed on the rod head 36.

In the rod portion 41, a contraction-side oil passage 51 and an extension-side oil passage 52 are formed side-by-side so as to extend in the axial direction. The extension-side oil passage 52 is formed so as to open at an end surface of the rod portion 41 on the piston 42 side and is in communication with the piston-side chamber 43. An opening portion of the contraction-side oil passage 51 that opens at the end surface of the rod portion 41 on the piston 42 side is closed by a plug 53, and the contraction-side oil passage 51 is not in communication with the piston-side chamber 43. A main communicating passage 54 is formed on the piston 42 side of the rod portion 41 in the radial direction such that the one end of the main communicating passage 54 opens at the outer circumferential surface of the rod portion 41 and the other end communicates with the contraction-side oil passage 51. The contraction-side oil passage 51 communicates with the rod-side chamber 44 through the main communicating passage 54. The contraction-side oil passage 51 corresponds to a rod inner space described in the Claim.

On the rod head 36 side of the rod portion 41, supply/discharge ports 55 and 56 are formed in the radial direction so as to respectively open at the outer circumferential surface of the rod portion 41 and communicate with the contraction-side oil passage 51 and the extension-side oil passage 52, respectively. Hydraulic piping is connected to the supply/discharge ports 55 and 56, and the hydraulic piping is connected to the hydraulic pump or the tank through the switching valve. As described above, because two supply/discharge ports 55 and 56 are formed on the tip end side of the piston rod 32, by attaching the actuator 200 such that the piston rod 32 is positioned at the upper side and the cylinder 31 is positioned at the lower side, the hydraulic piping connected to the supply/discharge ports 55 and 56 is positioned away from the ground surface, and it is possible to prevent the hydraulic piping from being damaged.

When the rod-side chamber 44 is connected to the hydraulic pump through the contraction-side oil passage 51 and when the piston-side chamber 43 is connected to the tank through the extension-side oil passage 52, the working oil is supplied to the rod-side chamber 44 and the working oil in the piston-side chamber 43 is discharged to the tank. As a result, the piston rod 32 moves in the downward direction in FIG. 3, thereby causing the actuator 200 to contract.

On the other hand, when the piston-side chamber 43 is connected to the hydraulic pump through the extension-side oil passage 52 and when the rod-side chamber 44 is connected to the tank through the contraction-side oil passage 51, the working oil is supplied to the piston-side chamber 43 and the working oil in the rod-side chamber 44 is discharged to the tank. As a result, the piston rod 32 moves in the upward direction in FIG. 3, thereby causing the actuator 200 to extend.

The actuator 200 exhibits cushioning effect for decelerating the piston rod 32 at the vicinity of the stroke end during extension. In the following, the cushioning effect will be described.

The rod portion 41 includes a first communicating passage 48 and a second communicating passage 49 that connect the contraction-side oil passage 51 and the rod-side chamber 44 of the cylinder 31, an orifice plug 60 that is provided in the first communicating passage 48 in an exchangeable manner and imparts resistance to the working oil passing therethrough to generate damping force, and a check valve 61 that is provided in the second communicating passage 49 and allows the flow of the working oil only from the contraction-side oil passage 51 to the rod-side chamber 44.

When the actuator 200 extends, in a case in which the piston rod 32 is positioned in a normal stroke range, the working oil in the rod-side chamber 44 is guided to and discharged from the supply/discharge port 55 through the contraction-side oil passage 51 from the main communicating passage 54. On the other hand, when the actuator 200 extends, in a case in which the piston rod 32 is positioned at the vicinity of the stroke end (the state shown in FIGS. 3 and 4), the main communicating passage 54 moves into the inside of the bearing 39, and the flow path area of the main communicating passage 54 is gradually reduced. As the flow path area of the main communicating passage 54 is reduced and as the pressure in the rod-side chamber 44 is increased, the working oil in the rod-side chamber 44 is discharged through the orifice plug 60, and after the main communicating passage 54 is shut off, the working oil in the rod-side chamber 44 is discharged only through the orifice plug 60. As described above, in a case in which the piston rod 32 is positioned at the vicinity of the stroke end, the pressure in the rod-side chamber 44 is increased and the piston rod 32 is decelerated. The cushioning effect is exhibited in such a way. While the cushioning effect is exhibited, the working oil in the rod-side chamber 44 is not discharged through the check valve 61.

A plurality of sub-communicating passages whose one ends open at the outer circumferential surface of the rod portion 41 and whose other ends open at the contraction-side oil passage 51 may be formed between the main communicating passage 54 and the first communicating passage 48 of the rod portion 41. In this case, after the main communicating passage 54 is shut off during the course of extension of the actuator 200, the sub-communicating passages are shut off in turn, and the working oil in the rod-side chamber 44 is eventually discharged only through the orifice plug 60. With such a configuration, even after the main communicating passage 54 is shut off, it is possible to prevent sudden exhibition of the cushioning effect.

In a case in which the actuator 200 contracts from the most extended state, because the working oil flows into the rod-side chamber 44 from the contraction-side oil passage 51 through the check valve 61, the actuator 200 quickly starts contraction.

A cushioning pressure that is the pressure in the rod-side chamber 44 under cushioning operation while the cushioning effect is exhibited is adjusted by the orifice plug 60. In other words, it is possible to freely adjust a level of the cushioning effect by changing the orifice plug 60.

The first communicating passage 48 and the second communicating passage 49 are formed in the radial direction of the rod portion 41 such that their one ends open at the outer circumferential surface of the rod portion 41 and their other ends open at the contraction-side oil passage 51. The first communicating passage 48 and the second communicating passage 49 are formed at substantially the same positions in the axial direction of the rod portion 41 but are formed at different positions in the circumferential direction of the rod portion 41.

The first communicating passage 48 is formed to have a constant inner diameter. On an inner circumferential surface of the first communicating passage 48, while a female screw 48a is formed on the outer-circumferential-surface side of the rod portion 41, a female screw is not formed on the contraction-side oil passage 51 side.

The orifice plug 60 has a male screw 60a that is formed on an outer circumferential surface thereof and threaded to the female screw 48a of the first communicating passage 48 and an orifice portion 60b that restricts the flow of the working oil. The orifice plug 60 is threaded and fastened to the first communicating passage 48, and damping force generated by the orifice plug 60 is determined by a diameter of the orifice portion 60b.

The second communicating passage 49 has a large-diameter portion 49a that opens at the outer circumferential surface of the rod portion 41 and a small-diameter portion 49b that opens at the contraction-side oil passage 51 and has smaller diameter than the large-diameter portion 49a. The check valve 61 has an annular seat surface 61a that is formed between the large-diameter portion 49a and the small-diameter portion 49b and a ball 61b that is accommodated in the large-diameter portion 49a and has a diameter larger than an inner diameter of the small-diameter portion 49b. When pressure on the large-diameter portion 49a side is greater than pressure on the small-diameter portion 49b side, the ball 61b is seated on the seat surface 61a, and the flow of the working oil from the large-diameter portion 49a side to the small-diameter portion 49b side is shut off. On the other hand, when the pressure on the small-diameter portion 49b side is greater than the pressure on the large-diameter portion 49a side, the ball 61b is separated from the seat surface 61a, and the flow of the working oil from the small-diameter portion 49b side to the large-diameter portion 49a side is allowed.

In a state in which the piston 42 is connected to the rod portion 41, the ring portion 58 of the piston 42 closes a part of the opening portion of the first communicating passage 48 at the outer circumferential surface of the rod portion 41. In other words, the piston 42 is connected to the rod portion 41 such that the ring portion 58 covers a part of the orifice plug 60. With such a configuration, the orifice plug 60 is prevented from falling off from the first communicating passage 48 to the rod-side chamber 44. Because a female screw is not formed on the inner circumferential surface of the first communicating passage 48 on the contraction-side oil passage 51 side, the orifice plug 60 also does not fall off to the contraction-side oil passage 51. As described above, it is possible to prevent the orifice plug 60 from falling off by the piston 42 that is connected to the rod portion 41.

In addition, in a state in which the piston 42 is connected to the rod portion 41, the ring portion 58 of the piston 42 closes a part of the opening portion of the second communicating passage 49 at the outer circumferential surface of the rod portion 41. In other words, the piston 42 is connected to the rod portion 41 such that the ring portion 58 covers a part of the check valve 61. With such a configuration, the ball 61b of the check valve 61 is prevented from falling off from the second communicating passage 49 to the rod-side chamber 44. Because the ball 61b has a diameter larger than the inner diameter of the small-diameter portion 49b of the second communicating passage 49, the ball 61b also does not fall off to the contraction-side oil passage 51. As described above, it is also possible to prevent the check valve 61 from falling off by the piston 42 that is connected to the rod portion 41.

In order to prevent the orifice plug 60 and the check valve 61 from falling off, a length of the ring portion 58 of the piston 42 in the axial direction needs to be set suitably. Specifically, the length of the ring portion 58 in the axial direction needs to be set such that a tip end of the ring portion 58 overlaps with a part of the orifice plug 60 but does not reduce a flow path of the orifice portion 60b, and at the same time, the length of the ring portion 58 needs to be set such that the ball 61b of the check valve 61 does not fall off from the large-diameter portion 49a of the second communicating passage 49.

To change the orifice plug 60, the piston 42 is unthreaded from the rod portion 41, and the piston 42 is detached from the rod portion 41. By doing so, an end surface of the orifice plug 60 is exposed to the opening portion of the first communicating passage 48 at the outer circumferential surface of the rod portion 41. In this state, the orifice plug 60 is removed from the first communicating passage 48 by attaching a tool to the orifice plug 60 from the outer-circumferential-surface side of the rod portion 41 and by rotating the orifice plug 60. The orifice plug 60 having the orifice portion 60b with the desired diameter is then fastened to the first communicating passage 48 using the tool.

As described above, changing of the orifice plug 60 is performed by detaching the piston 42 from the rod portion 41 and by changing the orifice plug 60 that is threaded and fastened to the first communicating passage 48 using the tool. As described above, because the orifice plug 60 can be changed with that having the orifice portion 60b having a different diameter, it is possible to easily adjust a level of the cushioning effect.

This second embodiment also affords the similar operational advantages as those of the above-mentioned first embodiment.

Embodiments of this invention were described above, but the above embodiments are merely examples of applications of this invention, and the technical scope of this invention is not limited to the specific constitutions of the above embodiments.

This application claims priority based on Japanese Patent Application No. 2014-85190 filed with the Japan Patent Office on Apr. 17, 2014, the entire contents of which are incorporated into this specification.

The invention claimed is:

1. A cylinder device, comprising:
 a cylinder having a piston-side chamber and a rod-side chamber; and
 a piston rod that is inserted into the cylinder so as to be movable back and forth, the piston rod including:
  a rod portion that extends outside the cylinder, the rod portion having
   a rod inner space formed therein, the rod inner space communicating with the piston-side chamber of the cylinder;
   a first communicating passage that connects the rod inner space and the rod-side chamber of the cylinder, the first communicating passage having an opening on an outer periphery of the rod portion and at the rod-side chamber; and
  a piston connected to an end portion of the rod portion, the piston being slidably movable in the cylinder and partitioning an interior of the cylinder into the piston-side chamber and the rod-side chamber;
  an orifice plug provided in the opening and being removable so as to be replaceable, the piston being connected to the rod portion so as to cover a part of the orifice plug at an outer surface of the rod portion.

2. The cylinder device according to claim 1, further comprising a second communicating passage that connects the rod inner space and the rod-side chamber of the cylinder and
 a check valve provided in the second communicating passage, the check valve being configured to allow a flow of working fluid only from the rod inner space to the rod-side chamber, wherein
 the piston is connected to the rod portion so as to cover a part of the check valve.

3. The cylinder device according to claim 1, wherein
 the cylinder device is a shock absorber that suppresses vibration of a vehicle body, and
 the orifice plug increases a resistance to working fluid passing through the orifice plug to generate damping force.

4. The cylinder device according to claim 1, wherein
 the cylinder device is an actuator that drives a load by extending and contracting by working fluid supplied from a fluid pressure source to the cylinder, and
 the orifice plug increases a resistance to the working fluid passing through the orifice plug to exhibit cushioning effect for decelerating the piston rod at a vicinity of a stroke end during extension of the actuator.

5. The cylinder device according to claim 1, wherein
 the first communication passage includes
  a threaded portion formed in a region of the opening, and
  a non-threaded portion formed in a region of an inner periphery of the rod portion,
 the orifice plug is threaded to the threaded portion, the non-threaded portion preventing the orifice plug from falling off to the rod inner space.

6. The cylinder device according to claim 1, wherein the piston has a cylindrical shape, and includes a fastening portion fastened to the rod portion and a ring portion provided along the outer periphery of the rod portion so as to cover a part of the orifice plug.

7. The cylinder device according to claim 6, wherein the ring portion overlaps a part of the orifice plug but does not reduce a cross-sectional area of a flow path of the orifice plug.

8. The cylinder device according to claim 2, wherein
 the second communicating passage includes a large-diameter portion that opens at the outer periphery of the rod portion and a small-diameter portion that opens at an inner periphery of the rod portion, the small-diameter portion having a diameter smaller than a diameter of the large-diameter portion,
 the check valve includes a ball accommodated in the large-diameter portion, the ball having a diameter greater than the diameter of the small-diameter portion, and
 the piston includes a fastening portion fastened to the rod portion and a ring portion provided along the outer periphery of the rod portion so as to cover a part of the orifice plug, the ring portion covering a part of the check valve so as to prevent the ball from falling off to the rod-side chamber.

9. A cylinder device, comprising;
 a cylinder having a piston-side chamber and a rod-side chamber; and
 a piston rod that is inserted into the cylinder so as to be movable back and forth,
 the piston rod including:
  a rod portion that extends outside the cylinder, the rod portion having a rod inner space therein, the rod inner space communicating with the piston-side chamber of the cylinder, a first communicating passage that connects the rod inner space and the rod-side chamber of the cylinder, and an orifice plug provided in the first communicating passage and being removable so as to be replaceable; and a piston that is slidably movable in the cylinder and partitions an interior of the cylinder into the piston-side chamber and the rod-side chamber, the piston being connected to an end portion of the rod portion in a state where the piston covers a part of the orifice plug at an outer surface of the rod portion so as to prevent the orifice plug from falling off from the first communicating passage.

10. The cylinder device according to claim 9, further comprising
a second communicating passage that connects the rod inner space and the rod-side chamber of the cylinder and
a check valve provided in the second communicating passage, the check valve being configured to allow a flow of working fluid only from the rod inner space to the rod-side chamber, wherein
the piston is connected to the rod portion so as to cover a part of the check valve.

11. The cylinder device according to claim 9, wherein the cylinder device is a shock absorber that suppresses vibration of a vehicle body, and the orifice plug increases a resistance to working fluid passing through the orifice plug to generate damping force.

12. The cylinder device according to claim 9, wherein the first communication passage includes
a threaded portion formed in a region of the opening and
a non-threaded portion formed on a region of an inner periphery of the rod portion,
the orifice plug is threaded to the threaded portion, the non-threaded portion preventing the orifice plug from falling off to the rod inner space.

13. The cylinder device according to claim 9, wherein the piston has a cylindrical shape, and includes a fastening portion fastened to the rod portion and a ring portion provided along the outer periphery of the rod portion so as to cover a part of the orifice plug.

14. The cylinder device according to claim 13, wherein the ring portion overlaps the part of the orifice plug but does not reduce a cross-sectional area of a flow path of the orifice plug.

15. The cylinder device according to claim 10, wherein
the second communicating passage includes a large-diameter portion that opens a the outer periphery of the rod portion and a small-diameter portion
that opens at an inner periphery of the rod portion, the small-diameter portion having a diameter smaller than a diameter of the large-diameter portion,
the check valve includes a ball accommodated in the large-diameter portion, the ball having a diameter greater than the diameter of the small-diameter portion, and
the piston includes a fastening portion fastened to the rod portion and a ring portion provided along the outer periphery of the rod portion so as to cover a part of the orifice plug, the ring portion covering a part of the check valve so as to prevent the ball from falling off to the rod-side chamber.

16. The cylinder device according to claim 1, wherein the opening faces away from a central axis of the piston rod.

17. The cylinder device according to claim 1, wherein the rod-side chamber is formed between an inner surface of the cylinder and an outer surface of the rode portion.

18. The cylinder device according to claim 9, wherein the opening faces away from a central axis of the piston rod.

19. The cylinder device according to claim 9, wherein the rod-side chamber is formed between an inner surface of the cylinder and an outer surface of the rode portion.

* * * * *